United States Patent Office 3,162,697
Patented Dec. 22, 1964

3,162,697
GRAFT COPOLYMER OF A MIXTURE OF ALKYL ACRYLATES ON POLYPROPYLENE AND PROCESS OF PREPARATION
Peter J. Canterino, Clifton, N.J., assignor to Phillips Petroleum Company, a corporation of Delaware
No Drawing. Filed Apr. 10, 1961, Ser. No. 101,642
13 Claims. (Cl. 260—878)

This invention relates to polypropylene compositions having improved properties. In accordance with one aspect, this invention relates to a process for modifying solid polypropylene to provide a product having improved properties. In accordance with another aspect, this invention relates to a molding composition of improved properties comprising a high surface area form of a modified solid polypropylene.

Polypropylene has been prepared by the use of the so-called organometallic initiator or catalyst systems. These polymers have wide utility in the molding of various articles. Furthermore, polypropylene is particularly useful when a high softening temperature is desired and when considerable pressure is to be applied to the polymeric article, for example, as in plastic pipes.

While polypropylene has many properties which are very desirable, the polymer also has certain properties which make it unsuitable for certain applications. For example, the brittleness temperature, i.e., the temperature at which the material is easily broken, is quite high and the embrittlement time of polypropylene, i.e., the time for air oxidation to cause the polymer to become brittle, is fairly short. While the embrittlement time can be tended, for example, by the incorporation of certain antioxidants and stabilizers, it would be very desirable if the polymer itself could be modified to extend its life without the addition of additives. Also, various materials have been blended with polypropylene to improve its brittleness temperature as well as to improve other properties of the polymer, e.g., its impact strength. For example, certain commercial grades of polypropylene are now being sold which contain polyisobutylene. Although various attempts have been made to improve the properties of polypropylene, there is still room for improvement.

According to the present invention it has been now discovered, quite unexpectedly, that polypropylene having improved properties, especially brittleness temperature, embrittlement time, impact strength, increased dyeability, and the like can be prepared by polymerizing onto the surface of the solid polymer a mixture of monomers.

Accordingly, an object of this invention is to provide a modified polypropylene having improved properties particularly with respect to brittleness temperature and embrittlement time.

Another object of this invention is to provide an improved method for modifying polypropylene to provide a product having improved properties.

A further object of this invention is to provide a process for forming a molded polypropylene product having improved properties.

Other aspects, objects and the several advantages of the invention are apparent from a study of the disclosure and the appended claims.

According to the invention, solid polypropylene is modified by contacting a high surface area form of the polymer with a mixture of alkyl acrylate polymerizable monomers and subjecting to polymerization conditions.

More specifically, according to the invention a process is provided for modifying a solid polypropylene which comprises producing such polymer in a form having a high surface area, for example, as finely divided polymer, applying to said finely divided polymer a monomeric mixture containing at least two polymerizable alkyl acrylate monomers together with a polymerization catalyst and subjecting the mixture thus obtained to polymerization conditions. The modified polypropylene product thus obtained can then be molded to provide a product having improved properties particularly with respect to brittleness temperature, embrittlement time, impact strength, increased dyeability, and the like.

The alkyl acrylate monomers that can be employed to modify polypropylene according to the invention have the structural formula

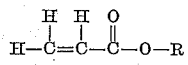

wherein R is an alkyl radical containing from 1 to 12, inclusive, carbon atoms. Representative examples of alkyl acrylates that can be employed according to the invention include: methyl acrylate, n-propyl acrylate, sec-butyl acrylate, 1,1-dimethylhexyl acrylate, n-decyl acrylate, 3-ethyldecyl acrylate, and the like. The monomeric mixture of acrylates employed preferably will be binary mixtures and will ordinarily contain from 10 to 90 weight percent of one alkyl acrylate, the remainder being another alkyl acrylate.

The polypropylene to be modified according to the practice of the present invention can be prepared by any of the methods which are usually employed in the preparation of these polymers. One suitable known process that can advantageously be employed for the preparation of polypropylene comprises mass polymerization of propylene in the presence of a catalyst or initiator system comprising titanium trichloride, preferably aluminum reduced, and a dialkylaluminum halide, preferably diethylaluminum chloride, and in the presence of a small amount of hydrogen, if desired.

The polypropylene which is contacted with the alkyl acrylate monomeric mixture preferably is in the form of a powder or porous particles or crumb in order that a high surface area is presented on which the monomers are adsorbed or coated. Polypropylene ground by a micropulverizer or similar device, or particles of polypropylene formed in a catalyzed process at a temperature below the solution temperature (particle form polymer), or polypropylene recovered as finely divided particles by any other procedure is suitable for use in the present process. For example, polypropylene particles suitable for use in the invention can be recovered from the effluent of a polypropylene polymerization process by coagulating the polymer as finely divided porous particles by methods well known in the art and then recovering the polymer particles from the resulting dispersion.

As previously indicated, the solid polypropylene is preferably contacted with a mixture of acrylate monomers and a polymerization catalyst and then subjected to polymerization conditions. Polymerization catalysts that can be used include those of the free radical type such as benzoyl peroxide, dicumyl peroxide, tert-butylbenzene hydro peroxide, potassium persulfate, and the like.

Polymerization conditions of temperature, pressure, etc. normally employed will be ordinarily governed by the monomer-catalyst system employed. The polymerization step will ordinarily be carried out at a temperature between 0° C. and the softening point of the polypropylene, preferably at a temperature below 150° C. The polymerization will generally be carried out for a time in the range between about 0.5 minute and 100 hours.

As indicated above, according to the invention a mixture of polymerizable alkyl acrylate monomers is applied to the polypropylene to be modified together with a polymerization catalyst, subjecting the monomer coated polymer to polymerization conditions, and then recovering a modified polypropylene product having improved properties. A frequently preferred method of operation comprises dissolving from 0.01 to 3.5 weight percent of the catalyst, based on the acrylate monomers, in the monomer mixture prior to its application to the polypropylene. Alternatively, the catalyst can be applied to the polypropylene prior to wetting the polymer with the mixture of acrylate monomers. The wetting step is preferably carried out at a temperature such that the monomers are in a liquid state.

Application of the monomer mixture to the polypropylene can be made by any suitable means. A convenient method is to tumble the polymer in a drum as the monomer is added, continuing the tumbling until homogeneous distribution is effected. The amount of monomer used will generally be in the range from about 1.0 to about 100 weight parts of the monomeric mixture per 100 parts of the propylene polymer, preferably in the range between about 5 and about 50 parts per 100 parts of polypropylene. The maximum amount will depend on the total surface area of the polypropylene and should not exceed that which can be retained as a coating thereon; that is, there should be no separate monomer phase other than that coating the polypropylene surface. Operation should be conducted under conditions such that the monomer remains in the liquid phase, using pressure if necessary.

After applying the alkyl acrylate monomer mixture and catalyst to the polypropylene, the mixture thus obtained will then be subjected to polymerization conditions as set forth above. The reaction products obtained by the practice of this invention are finely divided, pulverulent or crumb-like and are free flowing. These products can be molded, drawn or sheeted into films, fibers or other shaped articles. However, if desired the final gross reaction product after polymerization can be treated with a suitable solvent material, for example benzene, to remove acrylate homopolymers formed during polymerization before subjecting the modified polypropylene product to molding or other treatment. The final gross reaction product ordinarily comprises a graft copolymer of polypropylene and acrylates, some acrylate homopolymer and copolymer, and some polypropylene which has not reacted with the acrylate monomers.

Although in chemical terminology the term "modify" when applied to a process involving a polymer may connote an operation in which the molecular structure of the polymer is altered, for example, by graft copolymerization, in this specification and claims the term is used in a broader sense. It cannot be said that in the practice of the present invention no graft copolymerization occurs. However, the invention is applicable to polymers in which the graft polymerization, by the nature of the polymers used, is relatively small.

obtained with equivalent amounts of either one of the acrylates alone. As is shown by the specific examples hereinbelow, the modified polypropylenes of this invention have lower brittleness temperatures than untreated polypropylene, longer embrittlement times than unmodified polypropylene, and generally higher impact strength. These improvements in properties are achieved while maintaining a high modulus and the resulting modified polypropylene additionally has increased dyeability.

A better understanding of my invention will be obtained on reference to the following illustrative examples which are not intended, however, to be unduly limitative of the invention.

EXAMPLE I

A series of runs was carried out in which polypropylene, prepared in the presence of an organometallic catalyst system, was treated with various acrylic monomers in the presence of a polymerization catalyst.

The polypropylene which was used in these runs was prepared by slurry polymerization in liquid propylene in a 30-gallon reactor. To this reactor were charged 12 grams of titanium trichloride, 13.7 grams of diethylaluminum chloride and 65 pounds of propylene. The polymerization was carried out for 7.5 hours at 37.8° C. and 220–230 p.s.i.g. At the end of this time the polymer was removed from the reactor, washed with a mixture of isopropanol and glacial acetic acid at 132° C., filtered and dried. The weight of the dry polymer which was recovered was 9.2 pounds.

The above-prepared polypropylene was then contacted with various acrylic monomers in the presence of a polymerization catalyst so as to effect graft copolymerization of the acrylic monomer onto the surface of polypropylene.

In a typical run, 200 grams of finely divided polypropylene was charged to a polyethylene bag and to this polymer was applied a solution containing 0.8 gram of benzoyl peroxide in 30 to 40 grams of the acrylic monomer. The solution of catalyst in monomer was sprayed onto the polymer. The resulting mixture was then placed in a glass jar which was then closed and placed in an oven at 70–80° C. overnight. The temperature was then raised to 110° C. for 2 hours to insure complete polymerization. The polymer was then removed from the vessel and milled on a rubber mill to obtain a homogeneous mixture. Compression molded samples of the material were then formed and physical properties of these samples were determined. The results of these runs are expressed below as Table I. In the following table the samples which were tested for embrittlement time contain 0.2 weight percent 4,4'-thio-bis(6-tert-butyl-meta-cresol), which was milled into the polymer on a rubber mill.

Table I

| Run No. | 1 | 2 | 3 | 4 | 5 | 6 | 7 | 8 | 9 |
|---|---|---|---|---|---|---|---|---|---|
| Monomer Added | None | Methyl Acrylate | Methyl Acrylate/ Styrene | Butyl Acrylate/ Styrene | Methyl Acrylate/ Acrylonitrile | Butyl Acrylate | Methyl Acrylate/ Butyl Acrylate | Methyl Acrylate/ Butyl Acrylate | Commercial [1] Polypropylene |
| Pts. Monomer/100 Pts. Polymer | | 30 | 12/18 | 16/24 | 12/12 | 32 | 14/10 | 15/15 | |
| Flexural Modulus, p.s.i. [3] | 175,000 | 127,000 | 232,000 | 113,000 | 238,000 | 96,000 | 122,000 | 125,000 | 176,000 |
| Hardness, Shore D [4] | 76 | 67 | 79 | 74 | 80 | 65 | 70 | 69 | 74 |
| Tensile, Impact, p.s.i. [5] | 22.3 | 20.7 | 15.1 | 17.5 | 16.1 | 18.5 | 19.5 | 41.3 | [2] 1.91 |
| Brittleness Temp., °F. [6] | 39 | 57 | 86 | 67 | 70 | 43 | 29 | 13 | 32 |

[1] Intermediate impact polypropylene, sold under the trade name of Profax 75A1 and contains polyisobutylene.
[2] Izod impact strength, by ASTM D-256.
[3] ASTM D790-49T.
[4] ASTM D676-49T.
[5] By the method of ASTM D-256 except that test strips are placed on edge.
[6] ASTM D746.

The results obtained by polymerization of the mixed acrylate monomers onto polypropylene according to the invention is particularly surprising in that improvements in the polymer properties are obtained which cannot be In the above table only Runs 7 and 8, wherein a mixture of methyl acrylate and butyl acrylate were employed, are within the scope of this invention. Runs 2 and 6 are control runs wherein each of the acrylates was used alone as the monomer. In Runs 7 and 8, it can be seen that the brittleness temperature was greatly reduced, while in the mixtures of acrylates with other monomers (Runs 3–5), the brittleness temperatures were higher than when acrylates were used alone (Runs 2 and 6). The results obtained in Runs 7 and 8 were unexpected in view of the comparative runs. Further, in Run 8, using a 50/50 mixture of methyl acrylate and butyl acrylate, a graft polymer was obtained having an embrittlement time of 183 hours at 150° C. and 1000 hours at 121° C. compared to 70 hours and 1000 hours, respectively, for commercial polypropylene. In determining embrittlement time, strips 0.5" x 5" x 1/16" were hung in a circulating air oven at the indicated temperature and periodically tested for embrittlement. Failure was indicated by breaking of the strips when subjected to 180° bend. The tests were discontinued at 1000 hours.

EXAMPLE II

In another series of runs a mixture of methyl acrylate and butyl acrylate was graft polymerized onto polypropylene and the properties of the resulting polymer were compared to blends of polypropylene with the corresponding amounts of methyl acrylate-butyl acrylate copolymer.

The polypropylene which was used in these runs was prepared by the procedure described in Example I except that a 5-gallon reactor was employed and hydrogen was present in the polymerization zone. One gram of $TiCl_3$ and 2.32 grams of diethylaluminum chloride (in heptane solution) were charged to the reactor and maintained in contact with liquid propylene at 37.8° C. for 3 hours in the presence of 9960 cc. of hydrogen (calculated at atmospheric conditions). The yield of polymer was 439 grams and this polymer was washed with methanol in a Waring Blendor and dried.

In Run 10, 100 parts of the polypropylene was blended with 36 parts of poly(methyl acrylate) which had been prepared by emulsion polymerization. The blending was carried out on a rubber mill, but a homogeneous blend of these materials could not be obtained. In Run 11, 100 parts of the polypropylene was blended with 36 parts of a 50/50 methyl acrylate/butyl acrylate copolymer which had been prepared by emulsion polymerization. This blending was carried out on a rubber mill and in this case a homogeneous blend was obtained.

In the invention run (Run 12), 100 parts of the polypropylene was contacted with 36 parts of a 50/50 mixture of methyl acrylate/butyl acrylate in the presence of 0.8 part benzoyl peroxide under the conditions set forth in Example I. This graft polymer was milled on a rubber mill to obtain a homogeneous mixture.

In each of the runs 0.2 weight percent of the antioxidant employed in Example I was milled into the polymer on the rubber mill. The properties of the polymers which were prepared in these runs are expressed below as Table II.

Throughout the application high surface area form is used to denote generically physical forms of the polymer in which the ratio of surface area to volume is high. For example, included are particulate materials, granular powder, and the like, such as described elsewhere in the application. For the pulverulent material, the polymer particles will preferably be 40 mesh or smaller (U.S. Standard Sieve).

As will be evident to those skilled in the art, many variations and modifications of the invention can be practiced in view of the foregoing disclosure. Such variations and modifications are clearly believed to come within the spirit and scope of the invention.

I claim:

1. Process for modifying solid polypropylene which is in a form having a high surface area which comprises polymerizing a mixture of polymerizable monomers thereon, and recovering said modified polypropylene, said monomers being alkyl acrylates having from 1 to 4, inclusive, carbon atoms in the alkyl groups and being present in the mixture to the extent of at least 10 weight percent of each monomer.

2. Process according to claim 1 wherein said monomer mixture comprises methyl acrylate and butyl acrylate.

3. Process according to claim 2 wherein said mixture comprises approximately a 50–50 mixture of said acrylates.

4. A process for modifying a solid polypropylene to improve its brittleness temperature which comprises producing said polymer in a form having a high surface area, applying to said polymer a monomeric mixture containing at least 10 weight percent of each of two polymerizable alkyl acrylate monomers having from 1 to 4, inclusive, carbon atoms in the alkyl groups together with a polymerization catalyst, subjecting the mixture to polymerization conditions, and recovering said modified polypropylene.

5. Process according to claim 4 wherein said monomer mixture comprises methyl acrylate and butyl acrylate.

6. Process according to claim 5 wherein said mixture is approximately a 50–50 mixture of said acrylates and the amount of said mixture applied ranges from about 5 to about 50 weight parts per 100 weight parts of polypropylene.

7. A process for forming a molded product which comprises inserting into a molding zone a moldable composition comprising a high surface area form of polypropylene having a coating formed by polymerizing a mixture of alkyl acrylate monomers having from 1 to 4, inclusive, carbon atoms in the alkyl groups on the surface thereof, and subjecting to molding conditions, said monomers being present in the mixture to the extent of at least 10 weight percent of each monomer.

8. A molding composition comprising a high surface area form of polypropylene having a coating formed by polymerizing on the surface of said polymer a mixture

*Table II*

| Run No. | 10 | 11 | 12 |
|---|---|---|---|
| Polymer | Polypropylene Blended With Polymethyl Acrylate | Propylene Blended With 50/50 Methyl Acrylate/Butyl Acrylate Copolymer | 50/50 Methyl Acrylate/Butyl Acrylate Graft Polymerized Onto Polypropylene |
| Melt Index, 230° C | 3.65 | 2.67 | 12.85 |
| Flexural Modulus, p.s.i. | 203,000 | 176,000 | 179,000 |
| Hardness, Shore D | 76 | 71 | 71 |
| Tensile Yield, p.s.i. | 3660 | 3246 | 3046 |
| Elong. at break, percent | 2 | 17 | 28 |
| Tensile Impact, p.s.i. | 14.8 | 27.6 | 31.1 |
| Brittleness Temp., ° F | 97 | 74 | 27 |

It can be seen that the graft polymer has a lower brittleness temperature, a higher impact strength and a higher melt index than the control runs which were formulated by blending.

of alkyl acrylates having 1 to 4, inclusive, carbon atoms in the alkyl groups, said monomers being present in the mixture to the extent of at least 10 weight percent of each monomer.

9. Composition according to claim 8 wherein said mixture comprises methyl acrylate and butyl acrylate.

10. Composition according to claim 9 wherein said mixture is approximately a 50–50 mixture of methyl acrylate and butyl acrylate.

11. Process according to claim 2 wherein said mixture comprises approximately a 60 methyl acrylate/40 butyl acrylate mixture.

12. Process according to claim 5 wherein said mixture is approximately 60 methyl acrylate/40 butyl acrylate and the amount of said mixture applied ranges from about 5 to about 50 weight parts per 100 weight parts of polypropylene.

13. Composition according to claim 9 wherein said mixture is approximately 60 methyl acrylate/40 butyl acrylate.

References Cited in the file of this patent

UNITED STATES PATENTS

| | | |
|---|---|---|
| 2,837,496 | Vandenberg | June 3, 1958 |
| 2,987,501 | Rieke et al. | June 6, 1961 |

FOREIGN PATENTS

| | | |
|---|---|---|
| 814,393 | Great Britain | June 3, 1959 |
| 553,779 | Belgium | June 28, 1957 |